United States Patent
Bright

[15] 3,658,484
[45] Apr. 25, 1972

[54] COUNTERCURRENT CONTACT APPARATUS

[72] Inventor: Arthur W. Bright, P.O. Box 3242, Kingsport, Tenn. 37664

[22] Filed: Oct. 24, 1969

[21] Appl. No.: 868,985

[52] U.S. Cl..........................23/270.5, 23/310, 196/14.52, 261/114, 202/158, 55/444
[51] Int. Cl......................................................B01d 11/00
[58] Field of Search.................23/267, 270, 270.5, 309, 310; 196/14, 52; 261/113, 109, 114; 202/158; 55/444, 442, 443

[56] References Cited

UNITED STATES PATENTS

| | | | |
|---|---|---|---|
| 1,671,110 | 5/1928 | Gibson | 261/113 |
| 1,937,958 | 12/1933 | Huff | 202/158 |
| 2,311,372 | 2/1943 | Dons | 196/14.52 |
| 2,646,266 | 7/1953 | Lockwood | 261/114 |
| 2,675,215 | 4/1954 | Otto | 55/445 |
| 2,702,236 | 2/1955 | Clark | 261/113 |
| 2,983,493 | 5/1961 | Hardwerk | 261/109 |

FOREIGN PATENTS OR APPLICATIONS

| | | | |
|---|---|---|---|
| 114,491 | 4/1926 | Switzerland | 55/444 |
| 500,690 | 3/1920 | France | 55/444 |
| 1,029,777 | 3/1953 | France | 55/444 |

Primary Examiner—Norman Yudkoff
Assistant Examiner—S. J. Emery
Attorney—Larson, Taylor & Hinds

[57] ABSTRACT

An apparatus comprising a vertical shell, first means at one end of said shell for introducing a fist fluid, second means at the other end of said shell for introducing a second fluid, at least one contact stage disposed in said shell between said first and second means, said contact stage comprising a head baffle, a set of baffles disposed above said head baffle and a set of baffles disposed below said head baffle, the baffles in each of said sets being disposed one above the other and one below the other, respectively, in a staggered relationship to each other in a direction away from the head baffle, baffles in said set of baffles above said head baffle having an edge in vertical alignment with an edge of a corresponding baffle in said set of baffles below said head baffle.

6 Claims, 6 Drawing Figures

Patented April 25, 1972

3,658,484

SIDE TO SIDE FLOW

SIDE TO SIDE FLOW

SIDE TO CENTER FLOW

ARTHUR W. BRIGHT,
INVENTOR

BY Larson and Taylor
ATTORNEYS

COUNTERCURRENT CONTACT APPARATUS

This invention relates to an apparatus useful for countercurrent contact processes, especially for liquid-to-liquid extraction processes. More particularly, the invention is concerned with a contact apparatus which incorporates a novel baffle system that permits maximum flow with minimum friction loss.

At the present time, there are many extraction processes wherein miscible or partially miscible fluids are brought into contact with each other to extract, for instance, a chemical constituent, heat values, contaminants, etc., from one of the fluids. The most common of these extraction processes is effected by what is known in the art as gravity type vertical extractors. The conventional gravity type vertical extractors, be they cocurrent, countercurrent or crosscurrent extractors, often employ a baffle system in order to maximize contact of the two fluids involved. It is well recognized that the greater the number and size of the baffles, the greater and more intimate the interface contact of the fluids. Unfortunately, increasing the interface contact increases friction losses through the column which, in turn, restricts vertical and/or horizontal flows. Restriction in vertical and/or horizontal flows, of course, results in reduction of extractor capacity and economic loss.

One object of the invention is to provide a baffle system for a fluid contact apparatus that practically eliminates or substantially reduces friction losses through the apparatus, thereby increasing extraction capacity.

Another object of the invention is to provide an apparatus for extraction processes which effects maximum flow with substantially reduced friction loss.

Yet another object of the invention is to provide an apparatus for liquid-liquid countercurrent extraction processes wherein the interfacial area is substantially increased with little or no friction loss through the extraction apparatus.

A further object of the invention is to provide a contact apparatus enabling inclusion of the desired number of baffles or contact plates without concern for the friction loss and vertical and/or horizontal flow restrictions that often accompany such baffle systems.

These and other objects of the invention, which will be apparent to one of ordinary skill in the art from the description to follow, are obtained by an apparatus comprising a vertical shell, a first means at one end of said shell for introducing a first fluid, a second means at the other end of said shell for introducing a second fluid, at least one contact stage disposed in said shell between said first and second means, said contact stage comprising a head baffle, a set of baffles disposed above said head baffle and a set of baffles disposed below said head baffle, the baffles in each of said sets being disposed one above the other and one below the other, respectively, in a staggered relationship to each other in a direction away from the head baffle, baffles in said set of baffles above said head baffle having an edge in vertical alignment with an edge of a corresponding baffle in said set of baffles below said head baffle.

In a preferred embodiment of the invention, the head baffle and said sets of baffles above and below said head baffle define a plurality of horizontal flow passages and a plurality of vertical flow passages, the total volume of said horizontal flow passages being substantially equal to the total volume of said vertical flow passages.

The invention will be more clearly understood by reference to the attached drawings wherein.

Figure 1A:
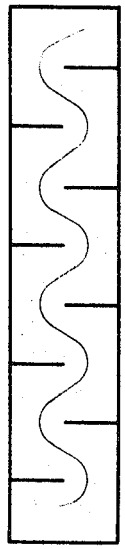
FIGS. 1A, 1B and 1c show diagrammatically vertical sections of three different conventional gravity type vertical extractors.
Figure 1B:
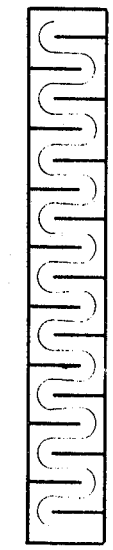
Figure 1C:
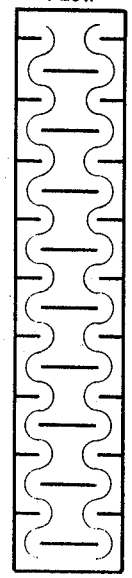

Referring to FIGS. 1A, 1B and 1C, the curved lines in the drawings represent the approximate flow pattern. It is seen that the conventional gravity type vertical extractors of FIG. 1A and FIG. 1B are designed for side-to-side flow while the extractor of FIG. 1C is designed for side-to-center flow. The extractors of FIG. 1A and FIG. 1C are also designed for maximum flow with the vertical and horizontal flows being equal. As is evident from an examination of FIGS. 1A and 1B, the contact efficiency of the flow systems they represent is less than desirable. Contact between fluids has been increased by gravity type extractor designs represented by FIG. 1B. Unfortunately, increasing contact by the extraction system of FIG. 1B necessitates a decrease in flow to keep the vertical and horizontal flows in balance.

Figure 2:
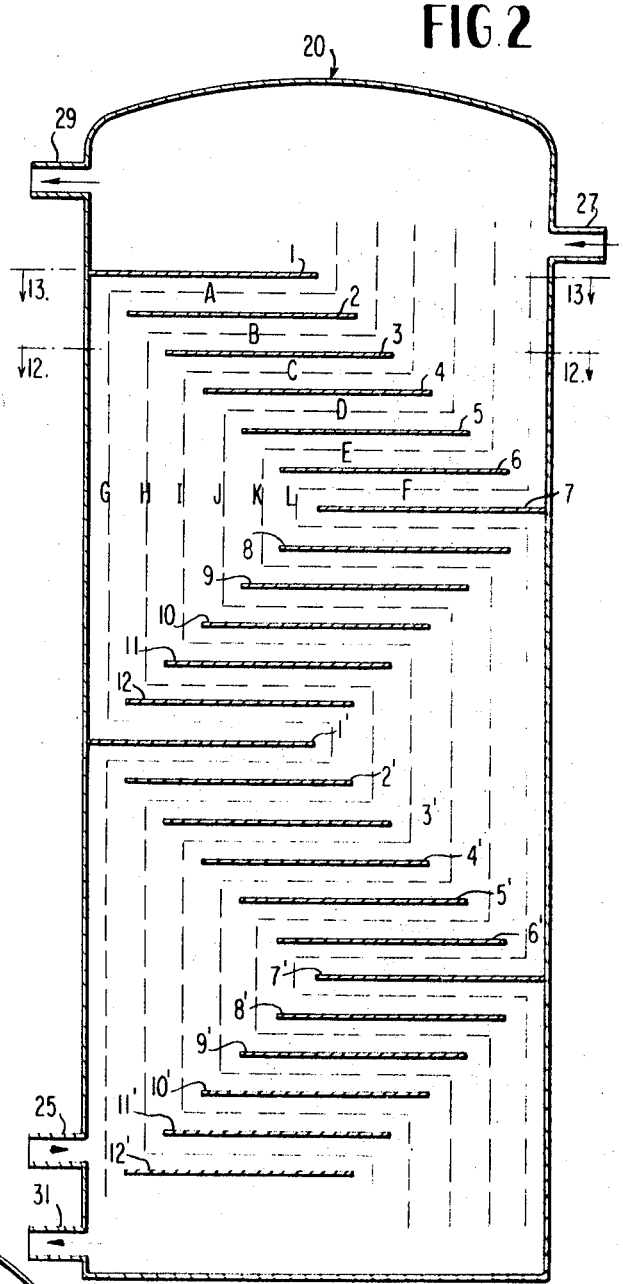
FIG. 2 shows diagrammatically a vertical section of one form of the apparatus of the invention.
Figure 3:
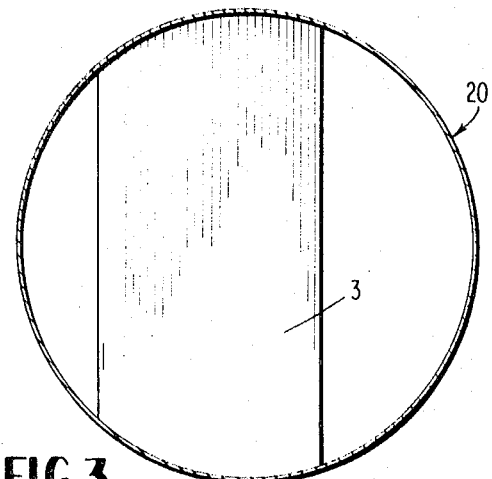
FIG. 3 is a cross-sectional view taken along lines 12 to 12' of FIG. 2.
Figure 4:
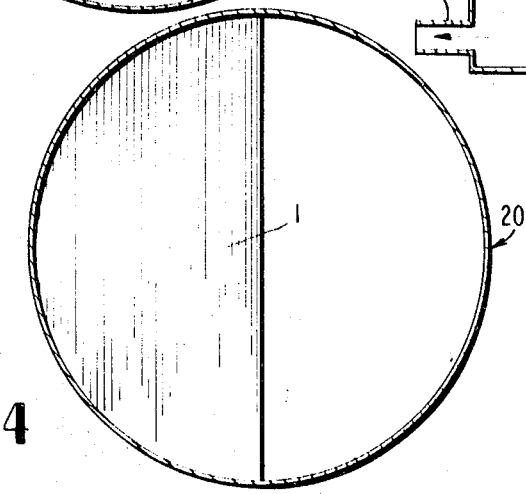
FIG. 4 is a cross-sectional view taken along lines 13 to 13' of FIG. 2.

These problems are avoided and the objects of the invention attained by the apparatus of FIGS. 2 to 4. Referring to these drawings, numeral 20 designates generally a vertically disposed shell which is preferably, but not necessarily, of circular cross-section. Frequently, shell 20 is a vertical cylindrical column, 3 to 8 feet in diameter and up to 100 feet high. An inlet means 25 is provided adjacent the bottom of the shell 3 for introducing a first liquid thereinto, and a second inlet means 27 is provided adjacent to the top of the shell 20 for introducing a second fluid thereinto. An outlet means 29 is provided the top of the shell 10 for removing light phase fluid flowing upward, and a second outlet means 31 is provided the bottom of the shell 10 for removing down-flowing heavy phase fluid. Between inlet means 25 and inlet means 27, there is provided a series of substantially horizontal, vertically spaced baffles; baffles 1 to 12 making up one contact section and baffles 1' to 12' making up another contact section. In the contact sections, baffles 1, 1', 7 and 7' constitute head baffles. A set of baffles 2 to 6 is disposed above head baffle 7, and a set of baffles 8 to 12 is disposed below head baffle 7. The baffles 2 to 6 are positioned on above the other in a staggered relationship to each other and said head baffle 7, and baffles 8 to 12 are positioned one below the other in a staggered relationship to each other and head baffle 7. The staggering of the baffles 2 to 6 above and baffles 8 to 12 below said head baffle 7 is in the same direction away from the head baffle 7 and in a manner that substantially aligns the edges of baffles 2 to 6 above the head baffle 7 with the corresponding edges of baffles 8 to 12 below the head baffle. Baffles 2' to 6' and baffles 8' to 12' are similarly disposed relation to head baffle 7'; and baffles 8' to 12' and baffles 2' to 6' are likewise similarly disposed with respect to head baffle 1', but the staggering is in an opposite direction. The number of baffles making up the sets above and below each head baffle can be any number desired, and the number of contact sections in a column likewise may be any desired number.

As aforementioned, the head baffle and sets of baffles above and below said head baffle define a plurality of horizontal flow passages and a plurality of vertical flow passages. In the preferred embodiment of the invention the these baffles are positioned so that the total volume of said horizontal flow passages is equal to the total volume of said vertical flow passages. Thus, referring to FIG. 2, for instance, the sum of the horizontal flow volumes of the passages A, B, C, D, E and F is substantially equal to the sum of the vertical flow volumes of the passages G, H, I, J, K and L.

The baffles or contact plates may be affixed to the shell 20 by any convenient fastening means. For instance, they may be welded in each contact section of the shell 20 or flanged as required. Where flanged sections are used, the baffles are held in place by flange bolts. The baffles may be solid or perforated and may take any desired shape or form. Lips (not shown) may be provided at an edge of the baffles, if desired, to assist in controlling the direction of flow.

The shell 20 may also contain additional means for assisting in the contact operation. For example, in liquid-liquid countercurrent contact pumps may be provided rather than relying solely on gravity.

Although the apparatus of the invention finds its greatest application in liquid-liquid countercurrent contact processes such as solvent extraction processes, it is not limited thereto. The apparatus is also applicable to vapor-vapor and liquid-vapor countercurrent contact operations. For instance, the apparatus can be applied to condensers and scrubber systems where maximum contact of liquid and vapor is necessary for maximum efficiency. The apparatus may also be used in horizontal condensers, the baffle system being used not only to give the water maximum cooling contact with minimum friction loss but to support tubes through which the water passes. Other applications of the apparatus include heaters, coolers, heat exchangers, etc. where friction losses are a problem.

In conducting liquid-liquid countercurrent contact operations, the lighter of two liquids is introduced into shell 20 through inlet means 25 at the bottom of the shell 20, and the heavier of the two liquids is introduced into the shell 20 through inlet means 27. The exact location of inlet means 25 and 27 near the top and the bottom of the column can be determined by experimentation. Distances from the top and the bottom of the column may vary with the type of solvent used and the liquids to be extracted. In the extraction of water from acetic acid-water mixtures, solvent is continuously introduced at the bottom as the light continuous phase, and the acetic acid-water mixture is introduced at the top as the heavy dispersed phase. The denser acetic acid-water mixture descends downwardly within the shell 20 while the solvent passes upwardly. The flow path of both ascending and descending liquids is indicated by dotted lines in FIG. 2. Water, substantially free of acetic acid, settles to the bottom and is removed via outlet means 31. The solvent containing extracted acetic acid moves to the top and is removed via outlet means 29.

While a very desirable form and employment of the invention is described, modifications of both are possible within the scope of the invention. It is to be understood, therefore, that the present disclosure is merely illustrative and nowise limiting, and that the invention comprehends such modifications that fall within the scope of the claims.

It is claimed:

1. An apparatus comprising a vertical shell, first means at one end of said shell for introducing a first fluid, second means at the other end of said shell for introducing a second fluid, a first outlet means at one end of said shell, a second outlet means at the other end of said shell, at least one contact stage disposed in said shell between said first and second means, said contact stage comprising an unperforated substantially horizontally disposed head baffle located adjacent and extending substantially horizontally from a wall of said shell, a set of unperforated baffles disposed above said head baffle and a set of unperforated baffles disposed below said head baffle with but a single baffle at any given level, said head baffle and said sets of baffles being of substantially equal width and positioned substantially perpendicular to the walls of said vertical shell, the baffles of said set of baffles above said head baffle being disposed in parallel relationship one above the other, the baffles of said set of baffles below said head baffle being disposed in parallel relationship one below the other, the top baffle of said set of baffles above said head baffle being located in proximity to and extending substantially horizontally from the wall opposite the wall adjacent to which the head baffle is positioned, the baffles intermediate said head baffle in said top baffle being disposed therebetween in a direction extending from said baffle to said top baffle in a substantially evenly staggered stepwise relationship to each other so that a portion of each baffle extends horizontally beyond an edge of the baffle disposed immediately above, the lower baffle in said set of baffles below said head baffle being located in proximity to and extending substantially horizontally from the wall opposite the wall adjacent to which the head baffle is positioned, the baffles intermediate said lower baffle and said head baffle in the direction extending from said lower baffle to said head baffle in a substantially evenly staggered stepwise relationship to each other so that a portion of each baffle extends horizontally beyond an edge of the baffle disposed immediately below, edges of each baffle in said set of baffles above said head baffle being in vertical alignment with an edge of one corresponding baffle in said set of baffles below said head baffle and a free space between said vertically aligned corresponding edges.

2. The apparatus of claim 1 wherein an equal number of baffles is disposed above and below said head baffle.

3. The apparatus of claim 2 wherein an edge of each of said baffles above said head baffle is in alignment with an edge of one of the baffles below said head baffle.

4. The apparatus of claim 2 wherein the baffles are disposed in said shell in a manner that provides a total horizontal flow volume substantially equal to the total vertical flow volume.

5. The apparatus of claim 4 wherein the shell is cylindrical.

6. The apparatus of claim 1 wherein at least two contact stages are disposed in said shell.

* * * * *